United States Patent
Lee et al.

(10) Patent No.: US 7,799,471 B2
(45) Date of Patent: Sep. 21, 2010

(54) FUNCTIONAL ELECTROLYTE ADDITIVES AND ELECTROCHEMICAL DEVICE COMPRISING THE SAME

(75) Inventors: Sang Young Lee, Daejeon (KR); Seok Koo Kim, Daejeon (KR); Jung Don Suk, Daejeon (KR); Hyun Hang Yong, Seoul (KR); Jang Hyuk Hong, Daejeon (KR); Soon Ho Ahn, Daejeon (KR); Yongku Kang, Daejeon (KR); Changjin Lee, Daejeon (KR); Mi Young Son, Seongnam-Si (KR)

(73) Assignees: LG Chem, Ltd. (KR); Korea Research Institute of Chemical Technology (KR)

( * ) Notice: Subject to any disclaimer, the term of this patent is extended or adjusted under 35 U.S.C. 154(b) by 1108 days.

(21) Appl. No.: 11/406,734

(22) Filed: Apr. 19, 2006

(65) Prior Publication Data

US 2006/0251970 A1    Nov. 9, 2006

(30) Foreign Application Priority Data

Apr. 19, 2005    (KR) ...................... 10-2005-0032434

(51) Int. Cl.
*H01M 6/04*    (2006.01)
(52) U.S. Cl. ......................... 429/347; 429/324; 429/326
(58) Field of Classification Search ........................ None
See application file for complete search history.

(56) References Cited

U.S. PATENT DOCUMENTS

| | | | |
|---|---|---|---|
| 4,970,012 A | 11/1990 | Kuroda et al. | |
| 6,727,024 B2 | 4/2004 | Kang et al. | |
| 6,783,897 B2 | 8/2004 | Kang et al. | |
| 2002/0007251 A1 | 1/2002 | Tanaka et al. | |
| 2003/0134968 A1* | 7/2003 | Kang et al. | ................. 524/588 |

FOREIGN PATENT DOCUMENTS

| | | |
|---|---|---|
| CN | 1362711 | 8/2002 |
| JP | 08-273665 | 10/1996 |
| KR | 100303394 | 7/2001 |
| RU | 2136084 | 8/1999 |

OTHER PUBLICATIONS

International Search Report for PCT/KR2006/001456 dated Jul. 31, 2006.

* cited by examiner

*Primary Examiner*—Patrick Ryan
*Assistant Examiner*—Cynthia Lee
(74) *Attorney, Agent, or Firm*—Cantor Colburn LLP

(57) ABSTRACT

Disclosed is an electrolyte for a battery comprising: (a) an electrolyte salt; (b) an organic solvent; and (c) a functional electrolyte additive. An electrochemical device comprising the electrolyte is also disclosed. The additive used in the electrochemical device effectively controls the surface of a cathode active material, which otherwise causes side reactions with an electrolyte, due to the basic skeleton structure and polar side branches of the additive. Therefore, it is possible to improve the safety of a battery, while not adversely affecting the quality of a battery.

6 Claims, 1 Drawing Sheet

FUNCTIONAL ELECTROLYTE ADDITIVES AND ELECTROCHEMICAL DEVICE COMPRISING THE SAME

This application claims the benefit of the filing date of Korean Patent Application No. 10-2005-0032434, filed on 19 Apr. 2005, in the Korean Intellectual Property Office, the disclosure of which is incorporated herein in its entirely by reference.

TECHNICAL FIELD

The present invention relates to an electrolyte comprising an additive that can improve the safety of a battery while not adversely affecting the quality of a battery, and an electrochemical device comprising the same.

BACKGROUND ART

Recently, there has existed increasing interest in energy storage technology. Batteries have been widely used as energy sources in portable phones, camcorders, notebook computers, PCs and electric cars, resulting in intensive research and development for them. In this regard, electrochemical devices are the subject of great interest. Particularly, development of rechargeable secondary batteries is the focus of attention. Recently, continuous studies have been performed to develop a novel electrode and battery having an improved level of capacity density and specific energy.

Among the currently used secondary batteries, lithium secondary batteries, developed in early 1990's, have a higher drive voltage and energy density than those of conventional batteries using aqueous electrolytes (such as Ni-MH batteries, Ni—Cd batteries and $H_2SO_4$—Pb batteries), and thus are spotlighted in the field of secondary batteries. However, lithium secondary batteries have a problem related to their safety, due to ignition and explosion caused by the use of an organic electrolyte. Also, lithium secondary batteries have a disadvantage in that they are obtained via a relatively complicated manufacturing process.

Evaluation of and security in safety of batteries are very important. It should be considered in the first place that users have to be protected from being damaged due to malfunctioning of batteries. To satisfy this, safety of batteries is strictly restricted in terms of ignition and combustion in batteries by safety standards. Therefore, many attempts have been made to solve safety-related problems of batteries.

In order to prevent heat emission from batteries, various methods including use of a protection circuit, use of heat occlusion by a separator, etc., have been suggested. However, use of a protection circuit causes limitation in downsizing and cost reduction of a battery pack. A mechanism of heat occlusion by a separator often acts inefficiently, when heat emission is generated rapidly. Recently, use of organic electrolyte additives has been also suggested to solve the above-mentioned problems. However, safety mechanisms based on electrolyte additives have disadvantages in that calorific value (J) may vary depending on charging current or internal resistance of a battery, and timing is not uniform. Therefore, such safety mechanisms are always followed by degradation in the overall quality of a battery.

Meanwhile, thermal unstability of a lithium secondary battery is largely caused by side reactions between a cathode active material and an electrolyte. In other words, a cathode shows a very unstable structure in a charged state, particularly at high temperature. The cathode having an unstable structure in a charged state causes a rigorous exothermic reaction with an electrolyte, such reaction being followed by the structural collapse, resulting in liberation of oxygen. Thus, such exothermic reaction and oxygen liberation cause severe heat emission in a battery, and the battery may explode finally. Therefore, it is important to control the reaction heat generated by such side reactions between a cathode and an electrolyte in order to improve the safety of a battery. Under these circumstances, intensive research and development for a novel cathode active material has been conducted (Japanese Patent Publication No. 08273665 and U.S. Pat. No. 02/07251). In the case of the cathode active materials disclosed in the above patents, it is possible to control the exothermic reaction to a certain degree, as compared to other cathode active materials according to the prior art. However, the cathode active materials have disadvantages in that they are always followed by degradation in the quality or capacity of a battery.

BRIEF DESCRIPTION OF THE DRAWINGS

The foregoing and other objects, features and advantages of the present invention will become more apparent from the following detailed description when taken in conjunction with the accompanying drawings in which.

DISCLOSURE OF THE INVENTION

Figure 1:
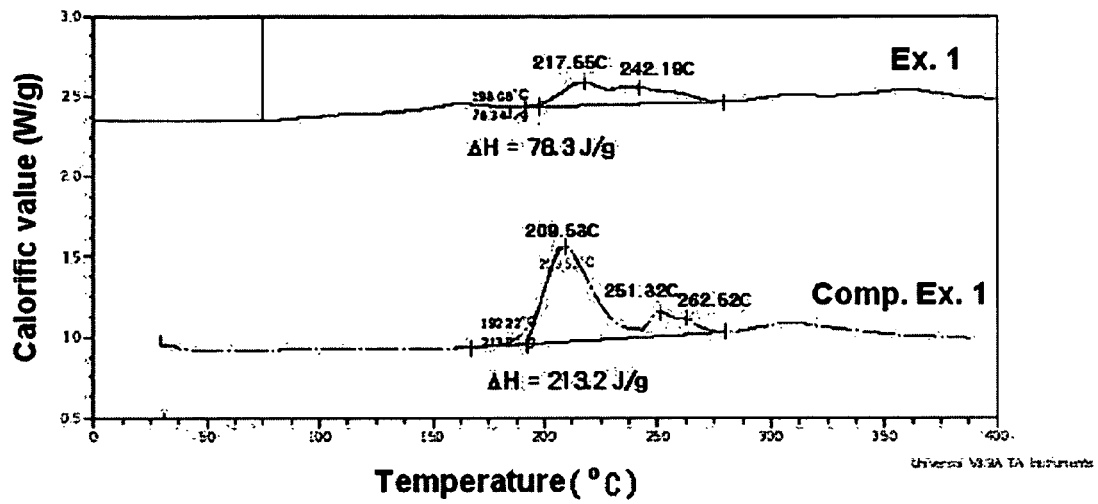
FIG. 1 is a graph showing the calorific value caused by the reaction of a cathode and an electrolyte in each of the batteries according to Example 1 and Comparative Example 1.
Figure 2:
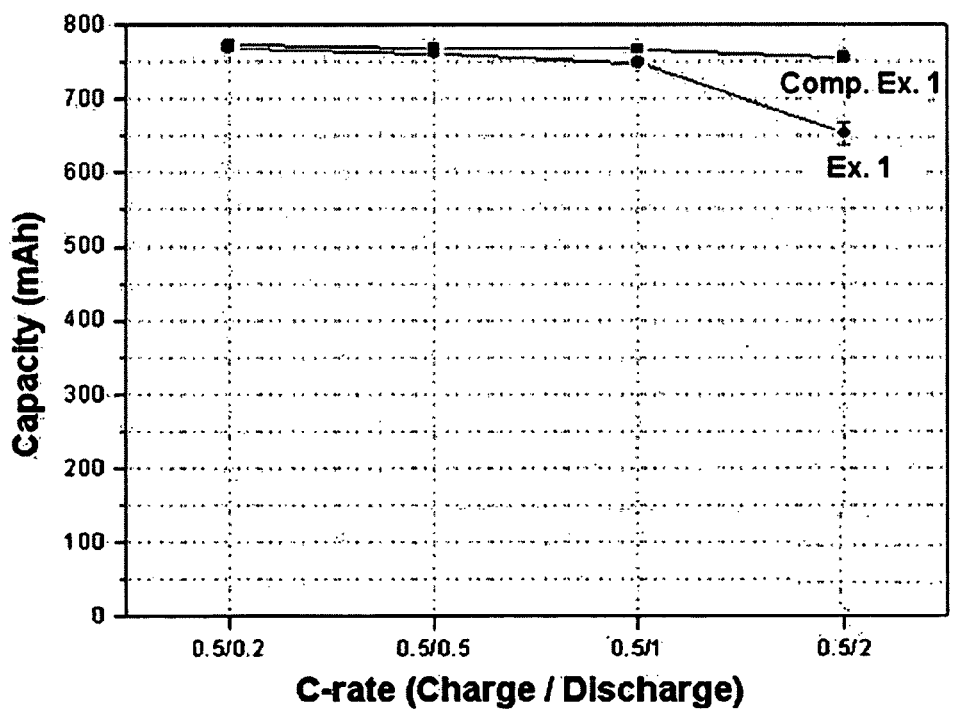
FIG. 2 is a graph showing the charge/discharge capacity of each of the batteries according to Example 1 and Comparative Example 1.

Therefore, the present invention has been made in view of the above-mentioned problems, The inventors of the present invention have found that when a specific high-safety additive, which can control the reaction heat of a side reaction between a cathode and an electrolyte so as to ensure the safety of a battery, is introduced into an electrolyte as a constitutional element of the electrolyte, it is possible to improve the safety of a battery while not adversely affecting the quality of a battery.

Therefore, it is an object of the present invention to provide an electrolyte comprising the high-safety additive and an electrochemical device comprising the same electrolyte.

According to an aspect of the present invention, there is provided an electrolyte for a battery, comprising: (a) an electrolyte salt; (b) an organic solvent; and (c) at least one compound selected from the group consisting of the compounds represented by the following formula 1 and the compounds represented by the following formula 2. There is also provided an electrochemical device, preferably a lithium secondary battery, comprising the same electrolyte.

According to another aspect of the present invention, there is provided an electrode comprising at least one compound selected from the group consisting of the compounds represented by the following Formula 1 and the compounds represented by the following Formula 2, wherein the compound is present partially or totally on a surface of the electrode. There is also provided an electrochemical device, preferably a lithium secondary battery, comprising the same electrode.

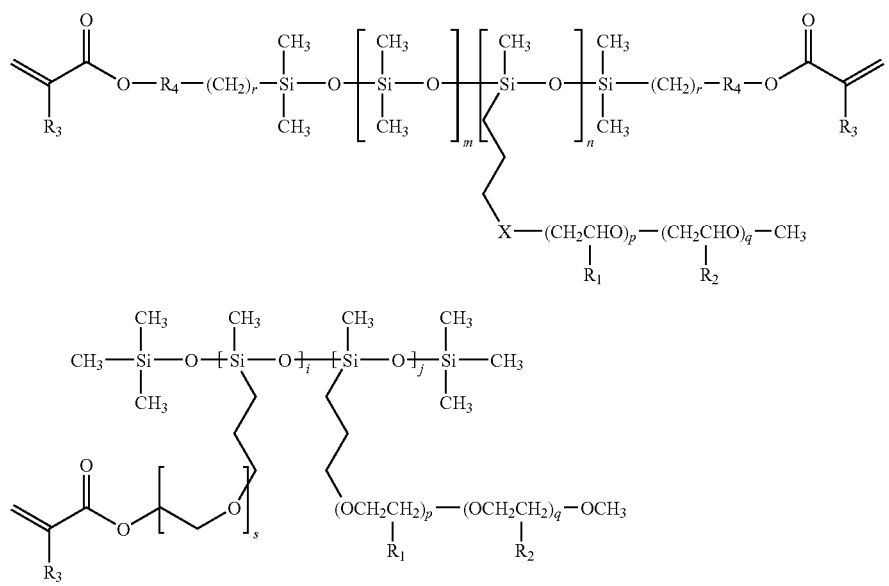

[Formula 1]

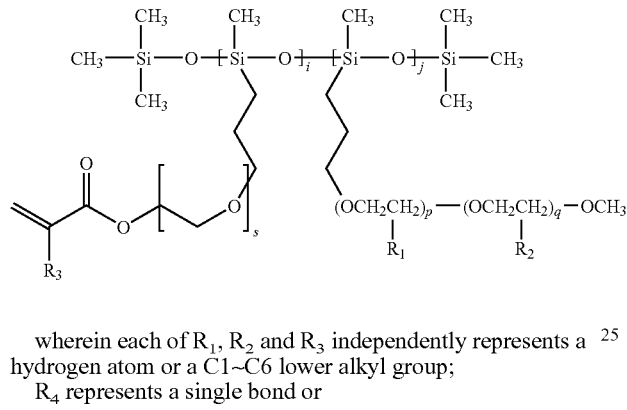

[Formula 2]

wherein each of $R_1$, $R_2$ and $R_3$ independently represents a hydrogen atom or a C1~C6 lower alkyl group;

$R_4$ represents a single bond or

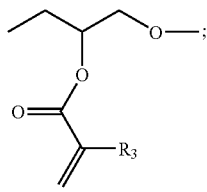

X represents

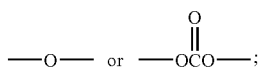

each of n and m represents an integer of 0~1000, each of p and q is an integer of 0~20 with the proviso that p and q cannot represent 0 at the same time, and r is an integer of 1~6; and each of i and j represents an integer of 1~1000, and s is an integer of 1~20.

As used herein, the term "lower" refers to a group, an atomic group or a compound having at most six carbon atoms, preferably at most five carbon atoms.

The term, "lower alkyl group" means a linear or branched lower saturated aliphatic hydrocarbon and particular examples thereof include methyl, ethyl, n-propyl, isopropyl, n-butyl, sec-butyl, isobutyl, tert-butyl and n-pentyl groups.

Hereinafter, the present invention will be explained in more detail.

The inventors of the present invention have disclosed a solid polymer electrolyte for a lithium polymer battery, which comprises the same monomer compound represented by the above formula 1, a curing initiator, a lithium salt and an organic solvent in a predetermined ratio (Korean Patent Publication No. 0419864). In the solid polymer electrolyte, the compound represented by formula 1 merely serves as a monomer component for forming a crosslinked polymer in order to improve the mechanical properties of a finally formed crosslinked solid thin-film electrolyte by virtue of the three-dimensional network structure of the electrolyte, and thus to improve the electrochemical stability of the resultant battery.

On the contrary, the present invention is characterized by using the above compound as an electrolyte additive that can improve the safety of a battery by effectively controlling the reaction heat generated by side reactions between a cathode and an electrolyte.

It may be expected that the additive can improve the safety of a battery according to the mechanism as described hereinafter.

The high-safety additive according to the present invention has a unique chemical structure in the molecule, for example, comprises a basic skeleton structure with Si and ether groups, and further comprises 2~4 acryl functional groups with high reactivity, introduced at both ends of the skeleton structure. When an electrolyte containing the additive is injected into a battery, such polar side branches can be attached effective onto the surface of cathode active material particles, for example, via hydrogen bonding with an oxygen-containing polar group present on the surface of the cathode active material, and thus can be retained continuously even after repeating charge/discharge cycles. Therefore, it is possible to effectively control the active site where side reactions may occur between the cathode active material and the electrolyte, and thus to significantly reduce the calorific value, which is caused by the exothermic reactions such as side reactions between the cathode active material and the electrolyte and is generated from the structural collapse of the cathode. As a result, it is possible to prevent the battery from igniting and exploding due to the acceleration of electrolyte combustion and a so-called thermal runaway phenomenon, and thus to improve the safety of the battery.

Additionally, since the additive has high polarity and low viscosity, it does not cause dissociation of lithium ions in an electrolyte and does not reduce the lithium ion conductivity. Hence, it is possible to minimize degradation in the quality of a battery, caused by the use of the additive.

The electrolyte for a battery according to the present invention may be obtained by adding a compound represented by the above formula 1, a compound represented by the above formula 2 or a mixture thereof, to a conventional electrolyte for a battery, for example, a non-aqueous electrolyte comprising an electrolyte salt and an organic solvent.

Particular examples of the above compounds include a compound represented by the following Formula 3 (wherein n is 10 and p is 3), but are not limited thereto:

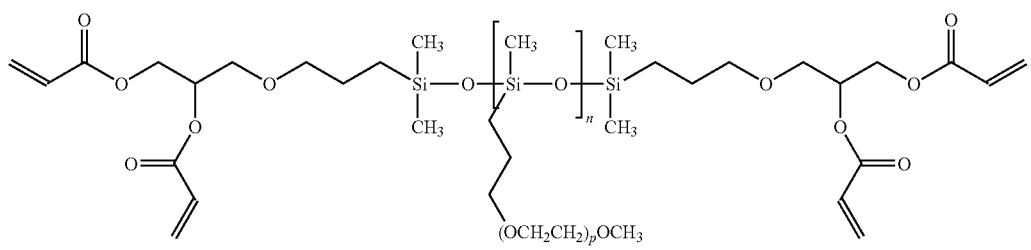

TA10 (n = 10, p = 3)

The compounds represented by formula 1, formula 2 and/or formula 3 comprise, as a basic skeleton structure, a polyalkylsiloxane polymer, into which an alkylene oxide group is introduced as a side branch, and a polar side branch, such as an acryl functional group, introduced at both ends or as a side branch. The compounds can provide the effect of improving the safety of a battery due to the aforementioned structure. More particularly, it is thought that the strongly polar groups in the side branches contained in the molecule are capable of masking of the active sites present on the surface of an electrode, thereby reducing the calorific value, cause by the side reactions between an electrolyte and a cathode and by the structural collapse of a cathode. Further, it is possible to impart excellent chemical properties, including improved ion conductivity, to a battery by introducing low molecular-weight polylalkylene oxide or other conventional polar side branches capable of improving conductivity.

In addition to the compounds represented by the above formula 1 and/or formula 2, compounds represented by formula 1 and/or formula 2, which further contain or are substituted with a functional group (e.g., polar group) known to one skilled in the art as a group for improving conductivity, are also included in the scope of the present invention.

The above compounds may be prepared by a conventional method known to one skilled in the art. For example, the above compounds may be obtained according to the method as described in Korean Patent Publication No. 0419864 based on the earlier patent application of the present inventors.

Although there is no particular limitation in the amount of the above high-safety additive, it is preferable to use the additive in an amount of 0.01~95 wt % based on 100 wt % of the electrolyte. If the additive is used in an amount of less than 0.01 wt %, it is not possible to control the reactions occurring on the surface of a cathode sufficiently, so that the calorific value cannot be controlled to a desired degree. If the additive is used in an amount of greater than 95 wt %, the resultant electrolyte has increased viscosity, so that the electrolyte cannot be injected with ease. Also, such increased viscosity of the electrolyte and decreased ion conductivity may result in degradation in the quality of a battery.

The electrolyte, to which the high-safety additive may be added according to the present invention, includes a salt represented by the formula of $A^+B^-$, wherein $A^+$ represents an alkali metal cation selected from the group consisting of $Li^+$, $Na^+$, $K^+$ and combinations thereof, and B— represents an anion selected from the group consisting of $PF_6^-$, $BF_4^-$, $Cl^-$, $Br^-$, $I^-$, $ClO_4^-$, $ASF_6^-$, $CH_3CO_2^-$, $CF_3SO_3^-$, $N(CF_3SO_2)_2^-$, $C(CF_2SO_2)_3^-$ and combinations thereof, the salt being dissolved or dissociated in an organic solvent selected from the group consisting of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), gamma-butyrolactone (γ-butyrolactone) and mixtures thereof. However, the electrolyte that may be used in the present invention is not limited to the above examples.

According to another aspect of the present invention, there is provided an electrode comprising at least one compound selected from the group consisting of the compounds represented by the following formula 1 and the compounds represented by the following formula 2, wherein the compound is present partially or totally on a surface of the electrode.

Herein, the electrode may be a cathode and/or an anode. Preferably, the electrode is a cathode in order to effectively control the side reactions between a cathode active material and an electrolyte, and the structural collapse of a cathode. However, the scope of the present invention is not limited thereto.

The electrode, whose surface comprises the above compound according to the present invention, may be obtained by forming the compound spontaneously along with reversible lithium ions on the surface of the electrode active material, from the compound present in the electrolyte, after repeating charge/discharge cycles using the electrolyte; by coating the surface of the electrode active material with the compound; or by using the compound as a material for forming the electrode. Otherwise, the electrode may be obtained by coating the surface of a preliminarily formed electrode with the compound.

In the electrode, the polar side branches present in the compound may be attached and retained on the surface of the electrode active material. Accordingly, it is possible to interrupt the side reactions between an electrode active material and an electrolyte, thereby improving the safety of a battery. Particularly, the polar side branches of the compound, attached to the surface of the electrode active material, form chemical bonds such as hydrogen bonds with the surface to form a kind of protective layer partially or totally on the surface of the electrode active material. In this case, the polar side branches can be retained stably in the battery with no damages even after repeating charge/discharge cycles.

In brief, when the compound represented by formula 1 and/or formula 2 is introduced into an electrode, the electrode active material, for example, a carbonaceous material, a transition metal and a transition metal oxide, can be stabilized, so as to prevent dissolution of a part of the transition metal from the electrode active material during repeated charge/discharge cycles. Additionally, when physical impact is applied from the exterior to a battery, it is possible to effectively control the exothermic reaction generated directly between the electrolyte and the electrode surface, and to prevent ignition and explosion of the battery, occurring when the internal temperature of the battery increases, by preventing a structural collapse of the electrode active material.

The electrode according to the present invention may be manufactured by applying an electrode active material onto a current collector according to a method known to one skilled in the art. In one embodiment of the method, electrode slurry comprising a cathode active material or an anode active material is applied onto a current collector, followed by drying. At this time, a small amount of a conductive agent and/or a binder may be optionally added.

More particularly, the cathode active material may include any conventional cathode active material currently used in a cathode of a conventional electrochemical device. Particular non-limiting examples of the cathode active material include lithium intercalation materials such as lithium manganese oxides, lithium cobalt oxides, lithium nickel oxides, lithium iron oxides or composite oxides thereof. Additionally, the anode active material may include any conventional anode active material currently used in an anode of a conventional electrochemical device. Particular non-limiting examples of the anode active material include lithium intercalation materials such as lithium metal, lithium alloys, carbon, petroleum coke, activated carbon, graphite or other carbonaceous materials. Non-limiting examples of a cathode current collector include foil formed of aluminum, nickel or a combination thereof. Non-limiting examples of an anode current collector include foil formed of copper, gold, nickel, copper alloys or a combination thereof.

According to still another aspect of the present invention, there is provided an electrochemical device comprising a cathode, an anode, a separator, and an electrolyte, wherein the electrolyte is an electrolyte, to which the above compound is added, and/or either or both of the cathode and the anode are the electrode comprising the above compound.

The electrochemical device includes any devices in which electrochemical reactions occur and particular examples thereof include all kinds of primary batteries, secondary batteries, fuel cells, solar cells or capacitors. Preferably, the electrochemical device is a lithium secondary battery. More preferably, the electrochemical device is a lithium ion secondary battery.

To manufacture the electrochemical device comprising the electrolyte, to which the high-safety additive is added according to the present invention, any method generally known to one skilled in the art may be used, In one embodiment of the method, an electrode assembly is provided by using a cathode and an anode, and a separator interposed between both electrodes, and then an electrolyte is injected thereto. Otherwise, the electrode having the above compound introduced thereto may be used alone or in combination with the high-safety additive-containing electrolyte.

There is no particular limitation in the separator that may be used in the present invention, and a polyolefin-based porous separator, currently used in the art, may be used.

According to the present invention, the electrolyte may be injected in a suitable step during the manufacturing process of an electrochemical device, according to the manufacturing process of a final product and desired properties. In other words, electrolyte may be injected, before an electrochemical device is assembled or in a final step during the assemblage of an electrochemical device.

Further, the electrochemical device obtained as described above shows improved safety due to the aforementioned mechanism. Herein, it is preferable that the cathode shows a calorific value to the electrolyte containing the high-safety additive introduced thereto, decreased by 0.01 J/g or more, as compared to the calorific value of the cathode to the electrolyte not containing the high-safety additive.

It is also preferable that the peak temperature, where the calorific value of the cathode to the electrolyte containing the high-safety additive introduced thereto reaches the maximum value, is increased by 0.01° C. or higher, as compared to the peak temperature of the cathode to the electrolyte not containing the high-safety additive.

BEST MODE FOR CARRYING OUT THE INVENTION

Reference will now be made in detail to the preferred embodiments of the present invention. It is to be understood that the following examples are illustrative only and the present invention is not limited thereto.

Example 1

Preparation of Electrolyte Containing Additive Introduced Thereto and Manufacture of Lithium Secondary Battery Comprising the Same (Manufacture of Cathode)

To N-methyl-2-pyrrolidone (NMP) as a solvent, 94 wt % of lithium cobalt composite oxide (LiCoO$_2$) as a cathode active material, 3 wt % of carbon black as a conductive agent and 3 wt % of PVDF (polyvinylidene fluoride) as a binder were added to form slurry for a cathode. The slurry was coated on aluminum (Al) foil having a thickness of about 20 μm as a cathode collector and dried to form a cathode. Then, the cathode was subjected to roll pressing.

(Manufacture of Anode)

To N-methyl-2-pyrrolidone (NMP) as a solvent, 96 wt % of carbon powder as an anode active material, 3 wt % of PVDF (polyvinylidene fluoride) as a binder and 1 wt % of carbon black as a conductive agent were added to form mixed slurry for an anode. The slurry was coated on copper (Cu) foil having a thickness of 10 μm as an anode collector and dried to form an anode. Then, the anode was subjected to roll pressing.

(Preparation of Electrolyte)

To an electrolyte (ethylene carbonate (EC)/propylene carbonate (PC)/diethyl carbonate (DEC)=30/20/50 (wt %) containing 1M of lithium hexafluoro phosphate (LiPF$_6$)), TA10 compound represented by the following formula 3 was added in an amount of 5 wt %.

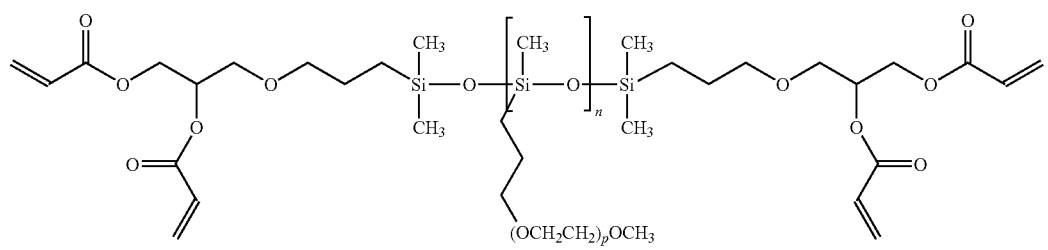

TA10 (n = 10, p = 3)

(Manufacture of Battery)

The cathode and the anode obtained as described above were stacked with a separator comprising three layers of polypropylene/polyethylene/polypropylene (PP/PE/PP) to provide an electrode assembly. Then, the electrolyte containing TA10 was injected thereto to provide a battery.

Comparative Example 1

Example 1 was repeated to provide a lithium secondary battery, except that a conventional electrolyte containing no additive was used instead of the electrolyte containing TA10 compound.

Experimental Example 1

Evaluation for Safety of Lithium Secondary Battery

The following test was performed to evaluate the safety of the lithium secondary battery comprising the electrolyte containing the high-safety additive according to the present invention.

The sample used in this test was the lithium secondary battery according to Example 1. The battery according to Comparative Example 1 was used as a control. After each battery was charged to 4.2V, the battery was disassembled to separate the cathode, and then thermal safety was evaluated to a temperature of 400° C. by DSC (differential scanning calorimetry).

After the test, the lithium secondary battery of Example 1, comprising the electrolyte containing the additive, showed a calorific value significantly reduced as compared to the calorific value of the battery according to Comparative Example 1, using the conventional electrolyte (see FIG. 1). Therefore, it can be seen from the above results that when the additive is introduced into an electrolyte, it is possible to improve the thermal safety of a battery.

Experimental Example 2

Evaluation for Quality of Lithium Secondary Battery

The following test was performed to evaluate the C-rate characteristics of the lithium secondary battery comprising the electrolyte containing the high-safety additive according to the present invention.

The sample used in this test was the lithium secondary battery according to Example 1. The battery according to Comparative Example 1, comprising the conventional electrolyte, was used as a control. Each battery having a capacity of 760 mAh was subjected to cycling at a discharge rate of 0.2C, 0.5C, 1C and 2C. The discharge capacity of each battery was expressed on the C-Rate basis.

After the test, the lithium secondary battery of Example 1, comprising the electrolyte containing the high-safety additive according to the present invention, showed C-rate characteristics comparable to those of the battery according to Comparative Example 1, comprising the conventional electrolyte, to the extent of a discharge rate of 1C, with the exception of slightly degraded characteristics at a discharge rate of 2C.

INDUSTRIAL APPLICABILITY

As can be seen from the foregoing, according to the present invention, it is possible to significantly improve the safety of a battery by introducing a high-capacity additive capable of controlling reactions between a cathode and an electrolyte to an electrolyte, while minimizing degradation in the quality of a battery.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is:

1. An electrochemical device comprising a cathode, an anode, a separator interposed between the cathode and the anode, and a liquid electrolyte, wherein the liquid electrolyte comprises:
   (a) an electrolyte salt;
   (b) an organic solvent; and
   (c) at least one compound selected from the group consisting of compounds represented by the following formula 1 and compounds represented by the following formula 2:

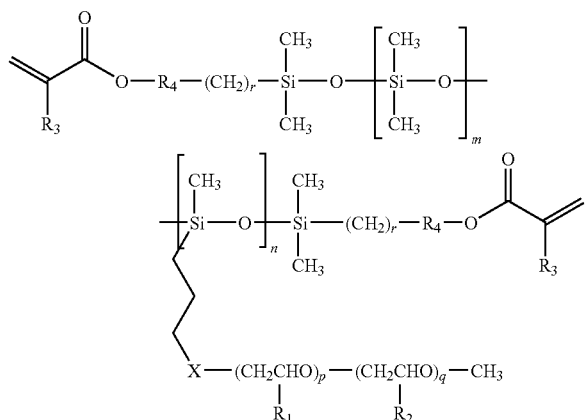

[Formula 1]

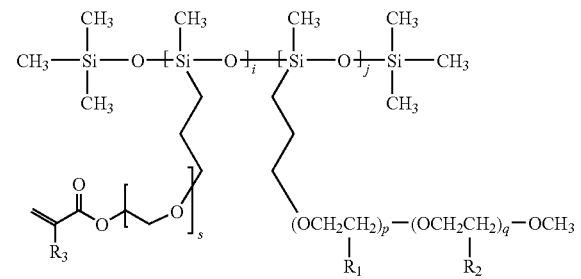

[Formula 2]

wherein each of $R_1$, $R_2$ and $R_3$ independently represents a hydrogen atom or a C1~C6 lower alkyl group;

$R_4$ represents a single bond or

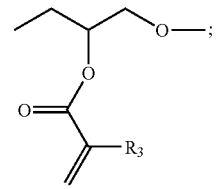

X represents

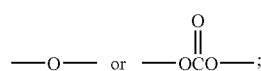

each of n and m represents an integer of 0~1000, each of p and q is an integer of 0~20 with the proviso that p and q cannot represent 0 at the same time, and r is an integer of 1~6; and each of i and j represents an integer of 1~1000, and s is an integer of 1~20.

2. The electrochemical device according to claim 1, wherein the compound is a compound represented by the following formula 3:

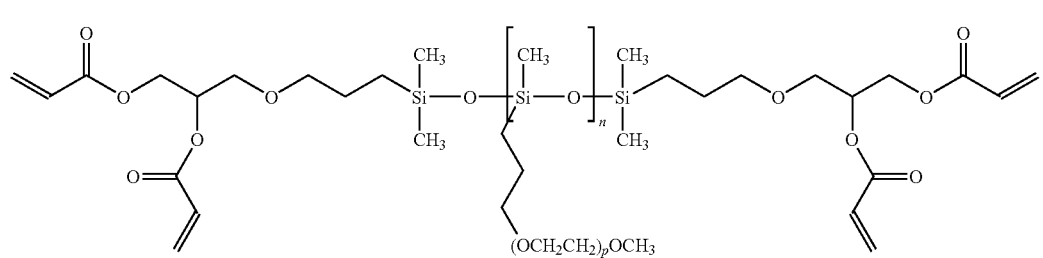

TA10 (n = 10, p = 3)

wherein n is 10 and p is 3.

3. The electrochemical device according to claim 1, wherein the compound reduces a calorific value of a battery by being attached to a surface of a cathode active material through polar side branches present in the compound, and by controlling side reactions between the cathode active material and the electrolyte or structural collapse of the cathode.

4. The electrochemical device according to claim 1, wherein the compound is used in an amount of 0.01~95 wt % based on 100 wt % of the total weight of the electrolyte.

5. The electrochemical device according to claim 1, which is a lithium secondary battery.

6. The electrochemical device according to claim 1, wherein the electrolyte salt is a salt represented by the formula of $A^+B^-$, in which $A^+$ is an alkali metal cation or a combination thereof, $B-$ represents an anion selected from the group consisting of $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ and combinations thereof; and the organic solvent is at least one solvent selected from the group consisting of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC) and gamma-butyrolactone (γ-butyrolactone).

* * * * *